United States Patent [19]
Braine et al.

[11] Patent Number: 5,992,262
[45] Date of Patent: Nov. 30, 1999

[54] SELF-CENTERING AND DAMPENING HYDROSTATIC TRANSMISSION LINKAGE

[75] Inventors: Jack K. Braine, Mohnton; Donald Russell Whitenight, Ephrata; Randall D. Kern, New Holland; Darryl T. Leeds, Wrightsville, all of Pa.

[73] Assignee: New Holland North America, Inc., New Holland, Pa.

[21] Appl. No.: 09/078,203

[22] Filed: May 14, 1998

Related U.S. Application Data

[60] Provisional application No. 60/047,240, May 21, 1997.

[51] Int. Cl.$^6$ .............................. G05G 5/05; G05G 1/14; F16H 61/40
[52] U.S. Cl. ............................ 74/473.16; 74/478; 74/560
[58] Field of Search ........................... 74/473.16, 473.17, 74/560, 478

[56] References Cited

U.S. PATENT DOCUMENTS

| | | | |
|---|---|---|---|
| 3,313,174 | 4/1967 | Walker et al. | 74/473.17 |
| 3,525,266 | 8/1970 | Brooks et al. | 74/470 X |
| 4,759,417 | 7/1988 | Wanie et al. | 180/6.34 |
| 5,233,880 | 8/1993 | Sato et al. | 74/473.16 |
| 5,896,959 | 4/1999 | Jeffries et al. | 267/150 X |

*Primary Examiner*—Allan D. Herrmann
*Attorney, Agent, or Firm*—J. William Stader; Larry W. Miller; Frank A. Seemar

[57] ABSTRACT

The disclosure relates to a self-centering and dampening hydrostatic transmission linkage. The invention consists of a pivot link that is pivotally attached to an isolator plate. Connecting the isolator plate to the pivot link is a centering damper. An upper rocker arm and lower rocker arm connect the pivot link to the hydrostatic transmission system control pedal. The pivot link also has a hydrostatic transmission adjustment rod and an aperture. The movement of the pedal controls the movement of the rod which adjust the tractor transmission for either forward or rearward travel. When a no force is placed on the pedal, the centering damper moves the aperture into contact with an adjustable spring steel detent. This ensures that the tractor transmission will remain in neutral. The pedal is designed with a foot rest and two elongated pads. This allows the operator flexibility when using the tractor for a variety of farm operations.

19 Claims, 12 Drawing Sheets

SELF-CENTERING AND DAMPENING HYDROSTATIC TRANSMISSION LINKAGE

This application claims benefit of Provisional Application No. 60/047,240, filed May 21, 1997.

BACKGROUND OF INVENTION

1. Field of Art

This invention relates to the improvement of an agricultural tractor. More specifically it relates to an improvement of the hydrostatic transmission.

2. Description of Prior Art

Agricultural tractors have been used for a variety of farming operations for decades. Tractors have become more versatile and are now being used for a greater number of agricultural tasks. More recently the use of a hydrostatic transmission has been used to propel the farm tractor. A hydrostatic transmission is simpler to operate. Instead of having to constantly depress a clutch to change the gears of a transmission, a hydrostatic transmission can be operated by depressing a pedal which controls a pump, which in turn controls a motor. One of the problems with a hydrostatic transmission is the risk that the operator will inadvertently leave the pedal slightly depressed and exit the tractor. The slightest movement of the pedal will result in the tractor 'creeping' and possibly injuring an individual. Another problem with the hydrostatic transmission involves the use of two pedals to control the motion of the tractor. Typically, there is a pedal for forward motion and a separate pedal for rearward motion. For some farm operations, such a those requiring a bucket or lift, an operator may be changing directions frequently. The constant alternating between the forward and reverse pedals is tiring to an operator.

The prior art illustrates these and additional difficulties. U.S. Pat. No. 4,759,417 discloses a system and method for controlling the ground speed and enhancing the maneuverability of an off-road vehicle. This patent uses two pedals 116 and 118 to control the speed and direction of the tractor. To prevent the tractor transmission from inadvertently remaining engaged, a complex series of springs adjust to maintain the tractor transmission in neutral. Because the transmission is sensitive to the slightest pedal depression, a grooved cam 74 is used to keep the transmission in precise adjustment. This design also results in the pedal quickly returning to neutral when the pedal is not depressed. This results in an abrupt stop causing the operator some discomfort. The quick motion of the pedal can also create an harmonic vibration which can potentially damage various tractor components. It is also necessary to dampen the motion of the pedal to limit the vibration caused by the tractor engine. This results in additional springs and rods adding cost and complexity to this design.

Consequently, the need exists for a self-centering hydrostatic transmission linkage which minimizes the number of parts and complexity of the transmission system. It would also be advantageous for a single pedal which can control the motion of an agricultural tractor.

OBJECTS OF THE INVENTION

It is an object of the present invention to provide a self-centering and dampening hydrostatic transmission linkage.

It is a further object of the present invention to provide a self-centering and dampening hydrostatic transmission linkage with a centering damper.

It is a further object of the present invention to provide a self-centering and dampening hydrostatic transmission linkage and an detent to maintain the transmission in neutral.

It is a further object of the present invention to provide a self-centering and dampening hydrostatic transmission linkage having a centering damper which can be adjusted.

It is a further object of the present invention to provide a self-centering and dampening hydrostatic transmission linkage having a detent which can be adjusted.

It is a further object of the present invention to provide an a self-centering and dampening hydrostatic transmission linkage having a single hydrostatic transmission control pedal.

It is a further object of the present invention to provide a self-centering and dampening hydrostatic transmission linkage having a balanced hydrostatic transmission control pedal.

It is a further object of the present invention to provide a self-centering and dampening hydrostatic transmission linkage having a hydrostatic transmission control pedal which can be used by a variety of operator's performing a several tasks.

It is a further object of the present invention to provide a self-centering and dampening hydrostatic transmission linkage having a centering damper which will automatically place the tractor's transmission into neutral and simultaneously dampen oscillation from the transmission.

It is a further object of the present invention to provide a self-centering and dampening hydrostatic transmission linkage having a single hydrostatic transmission system control pedal which can be alter the motion of the tractor.

It is a further object of the present invention to provide a self-centering and dampening hydrostatic transmission linkage which is easy and inexpensive to install and adjust in the tractor.

SUMMARY OF THE INVENTION

The invention overcomes the deficiencies of the prior art. The invention is a self-centering and dampening hydrostatic transmission linkage. The invention consists of an isolator plate with a pivot link pivotally attached. A centering damper connects the isolator plate to the pivot link. Attached to the pivot link is a hydrostatic transmission adjustment rod. Movement of this rod controls the direction and speed of the tractor transmission. Also attached to the pivot link is an upper rocker arm. Attached to the upper rocker arm is a lower rocker arm. A hydrostatic transmission system control pedal or hydro pedal is attached to the lower rocker arm. An adjustable spring steel detent is attached to the isolator plate and contacts an aperture in the pivot link to maintain the neutral position of the tractor transmission when there is no force on the hydro pedal. The hydro pedal is precisely balanced and has a narrow curved foot rest with an elongated forward pad and an oppositely located elongated rearward pad. This provides the operator with greater flexibility for a variety of farming operations. The detent and centering damper are easily adjusted by slotted openings.

BRIEF DESCRIPTION OF THE DRAWINGS

The advantages of this invention will be apparent upon consideration of the following detailed disclosure of the invention, especially when taken in conjunction with the accompanying drawings wherein.

DETAILED DESCRIPTION OF THE INVENTION

Figure 1:
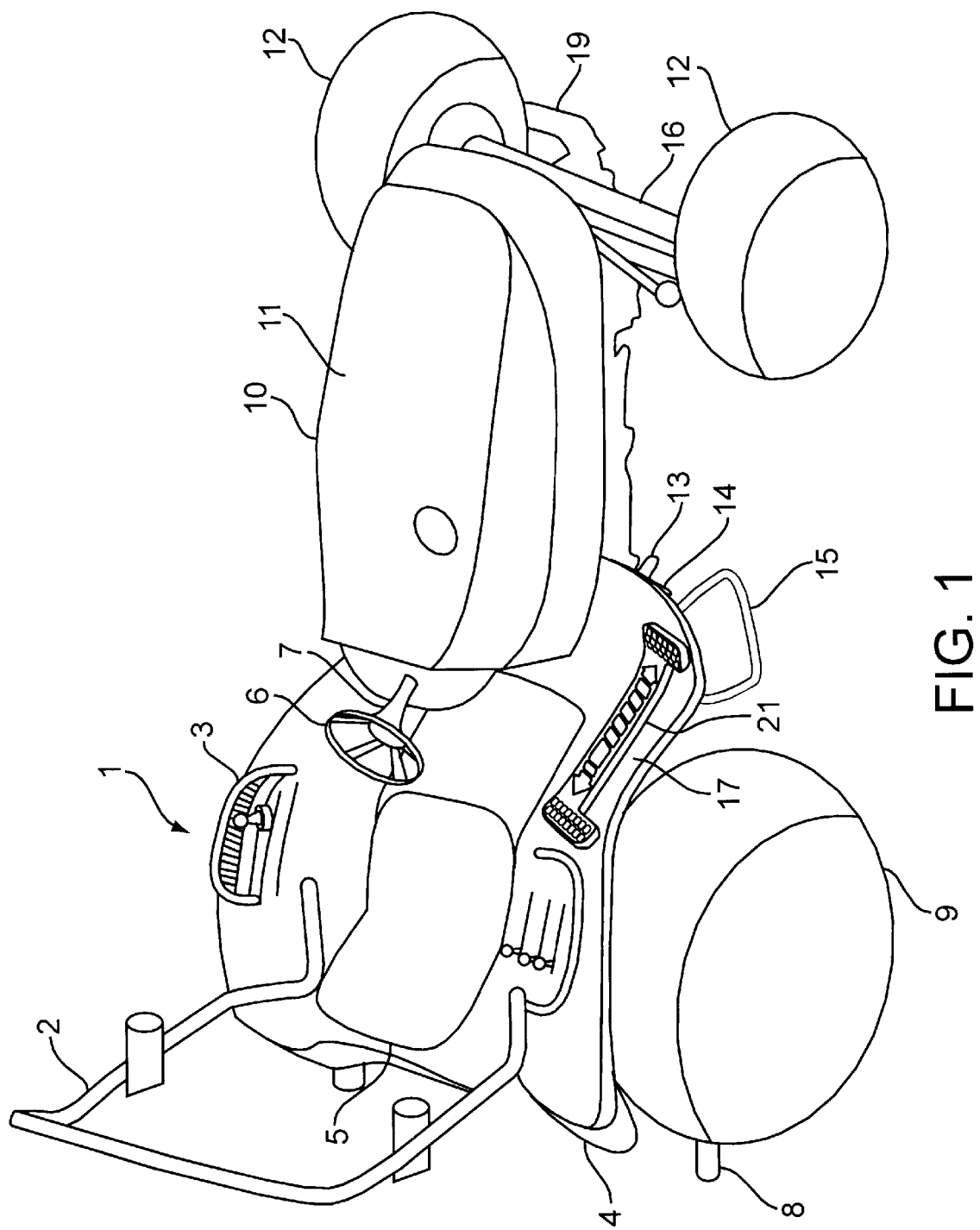
FIG. 1 is a general view of an agricultural tractor.

Referring to the drawings, it is possible to observe the major elements and general operation of the present invention. Left and right references are used as a matter of convenience and are determined by standing at the rear of the tractor and facing the forward end in the normal direction of travel. Likewise, forward and rearward are determined by normal direction of travel of the tractor. Upward or downward orientations are relative to the ground or operating surface. Horizontal or vertical planes are also relative to ground.

FIG. 1 illustrates a conventional agricultural tractor containing the present invention. A typical farm tractor 1 has pair of front wheels 12 and a pair of rear wheels 9 (only one shown) for movement and the support of the remainder of the tractor. There is an engine compartment 11 for supplying power and a fuel tank 10. An operator's platform 14 is reached by a platform step 15 and contains an operator's chair 5. From the operator's chair 5, the operator can observe and control a variety of farming operations. A steering wheel 6 supported by a steering column 7 is located in front of the operator's chair 5. There are a set of left-hand controls 3 and right-hand controls 4 for controlling the hitch 8, power-take-off (PTO) (not shown) and various other agricultural systems. A brake 13 is located on the operator's platform 14. The transmission housing 17 contains the transmission (not shown) which provide power to the rear wheels 9. The transmission is controlled by a hydrostatic transmission control pedal (hydro pedal) 21. The operator depresses the hydro pedal to control the speed and direction of the tractor. An operator is protected by a roll over protection bar 2. Although in many tractors, this protection is incorporated into an enclosed cab structure. Besides a hitch 8, many tractors have a front mount 19 so that other implements such as a bucket loader or lift can be installed. The present invention focuses on the region of the tractor containing the hydro pedal 21 and the transmission housing 17.

Figure 2:
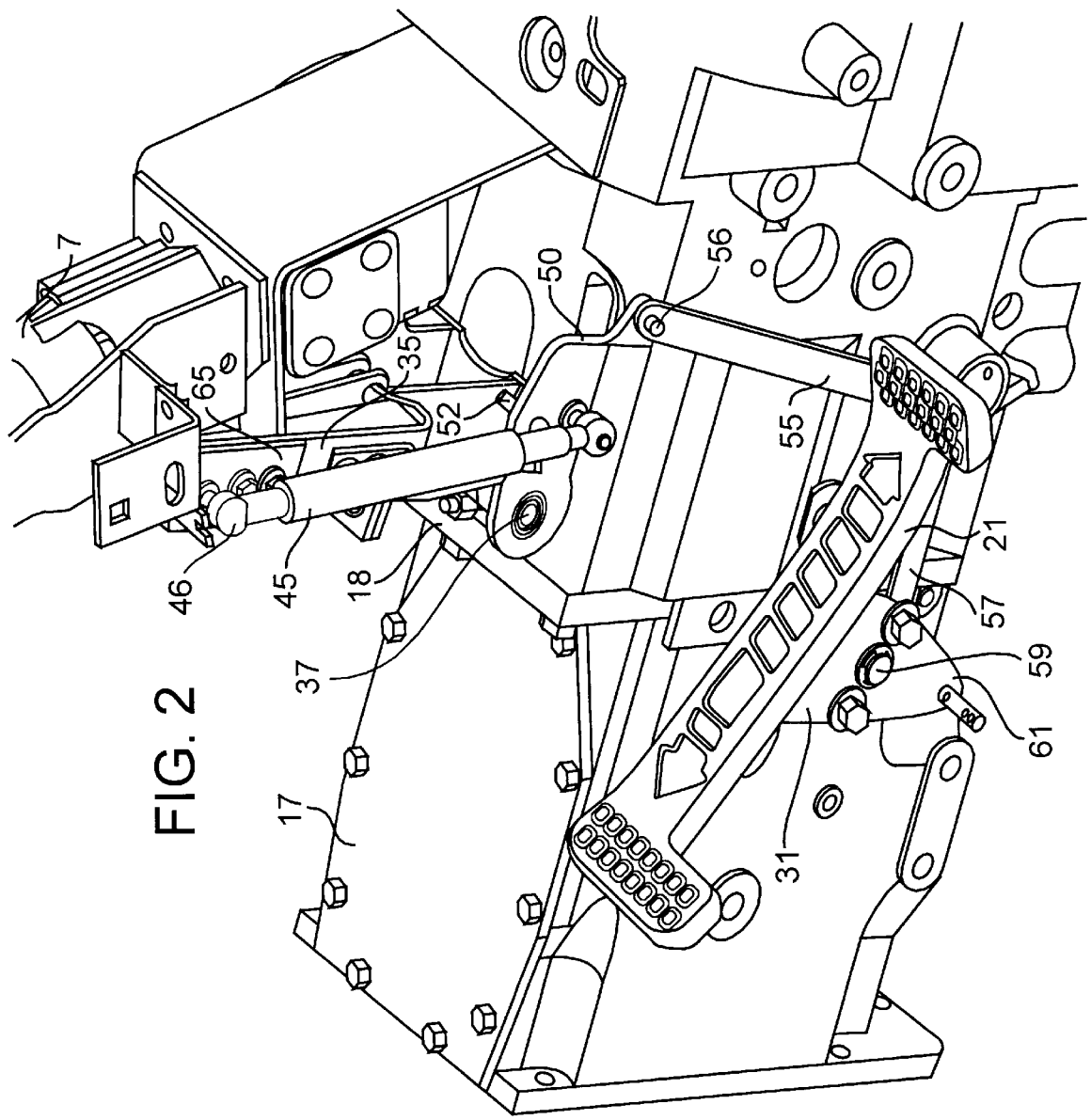
FIG. 2 is a side elevational view of the present invention.
Figure 3:
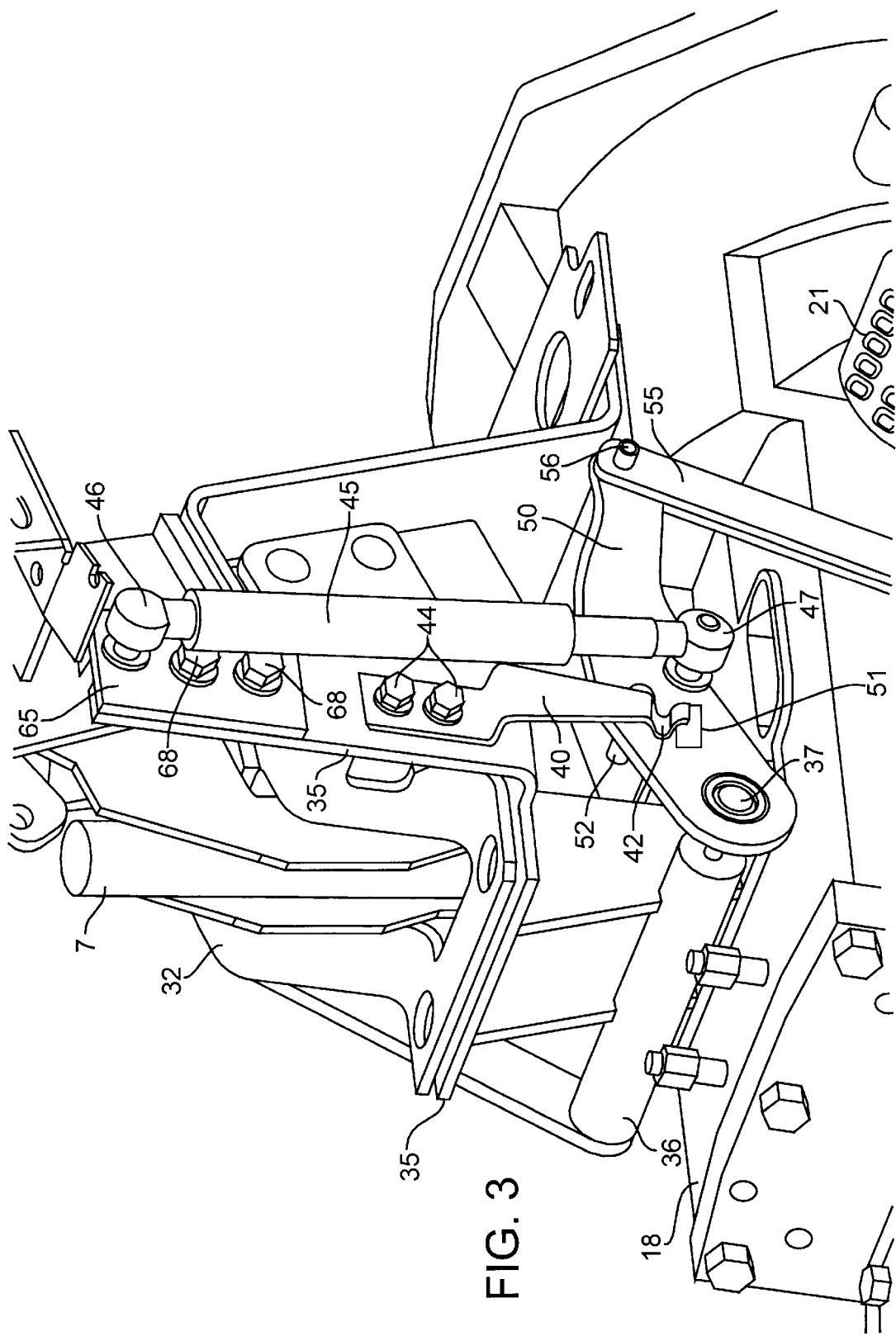
FIG. 3 is a side-rear elevation view of the present invention showing the centering damper and pivot link.

FIG. 2 illustrates the general elements of the present invention. With the exception of the hydro pedal 21, the invention is located beneath the operator's platform 14 and proximate to the transmission housing 17. Generally, the invention consists of a isolator plate 35 with a pivot link 50 pivotally attached. A centering damper 45 connects the isolator plate 35 to the pivot link 50. Also affixed to the pivot link 50 is the hydraulic transmission adjustment rod 52. The hydraulic transmission adjustment rod 52 enters the clutch housing 18. The rod 52 acts to control the speed and direction of the transmission. An upper rocker arm 55 and lower rocker arm 57 (see FIG. 4) connect the pivot link 50 to the hydro pedal 21. An operator depresses the hydro pedal 21 which adjusts the pivot link 50. The pivot link 50, in-turn, acts on the rod 52 to adjust the direction and speed of the tractor's transmission.

Now that the general elements have been reviewed, it is possible to discuss the specific elements. FIGS. 3, 9 10 and 11 provides a good overview of the isolator plate 50 and its' various elements. The isolator plate 35 is situated above the clutch housing and beneath the steering column support plate 32. It has a shaft tube 36 which supports the pivot link 50 at the shaft tube pivot 37. The isolator plate also has a pair of detent attach nuts 39 (see FIG. 9), a pair of neutral adjust nuts 38 (see FIG. 9) and an upper rod attach. 34. The adjust nuts 38 and detent nuts 39 may be pre-welded before attaching the remainder of the invention. The adjust nuts 38 and attach nuts 37 are oriented in a vertical line so as to facilitate adjustment and assembly of the remainder of the invention. On the opposite side from the neutral adjust nuts 38 is the neutral adjust mount 65 (see FIG. 11). The mount 65 has a pair of mount slots 66 which coincide with the adjust nuts 38. A pair of neutral adjust bolts 68 are inserted through the mount slots 66 and into the adjust nuts 38. The mount slots 66 allow for easy adjustment of the centering damper. Also on the neutral adjust mount 65 is an upper rod nut 67. Located beneath the neutral adjust mount 65 is the adjustable spring steel detent 40. Like the neutral adjust mount 65, the detent 40 has a pair of detent slots 41. These slots 41 receive a pair of detent attach bolts 44 which are inserted into the detent attach nuts 39. The detent slots 41 allow for easy adjustment of the detent 40. The detent also has a 'V' shaped clip or V clip 42 which consists of a pair of perpendicularly oriented walls 43.

As previously indicated, the pivot link 50 is pivotally connected to the shaft tube 36 at the shaft tube pivot 37. Also attached to the pivot link 50 is the hydrostatic transmission adjustment rod 52. The pivot link 50 also has an aperture 51 for receiving the 'V' clip 42 of the detent 40. Pivotally affixed to the pivot link 50 is the upper rocker arm 55. The upper rocker arm 55 is pivotally attached by the upper rocker pivot 56. A lower rocker arm 57 is pivotally affixed to the upper rocker arm 55 at the lower rocker pivot 58.

The centering damper 45 is pivotally attached to the neutral adjustment mount 65 and to the pivot link 45. The upper rod end 46 of the centering damper 45 is pivotally affixed into the upper rod nut 67 of the neutral adjustment mount 65. The upper rod nut 67 can be accessed through the upper rod attach 34 in the isolator plate 35. The lower rod end 47 located at the opposite end of the centering damper 45 is pivotally affixed to the pivot link 50. In the preferred embodiment, the centering damper is a combination gas spring and damper such model no. XP 3558 manufactured by AVM Inc. of Marion, S.C. The centering damper 45 returns to a pre-set position regardless of the previous position when the force is removed.

Figure 8B:
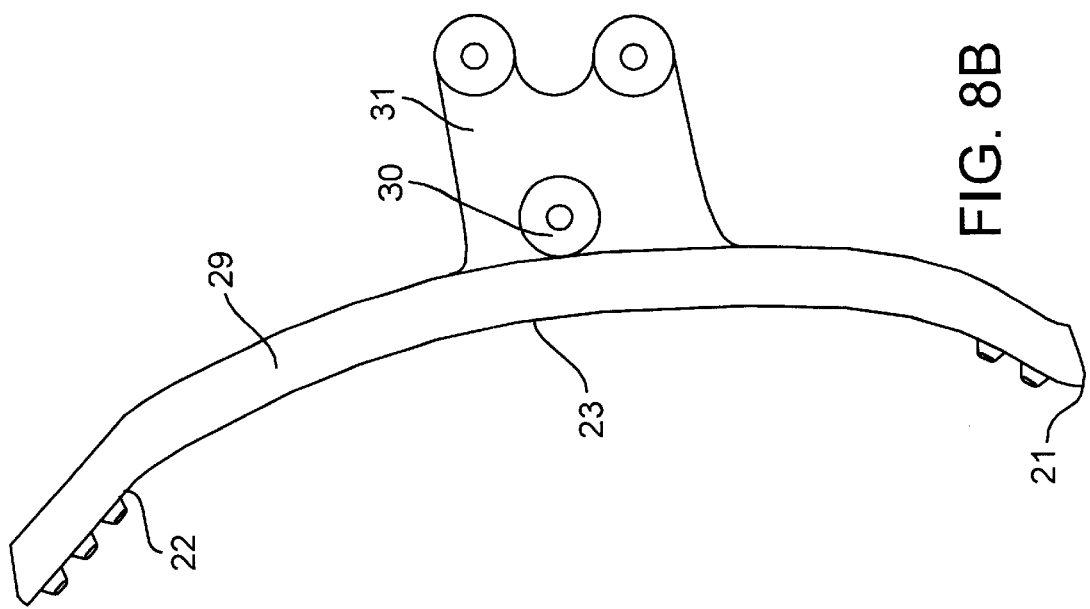
FIG. 8B is a side view of the hydrostatic transmission system pedal of the present invention.
Figure 8A:
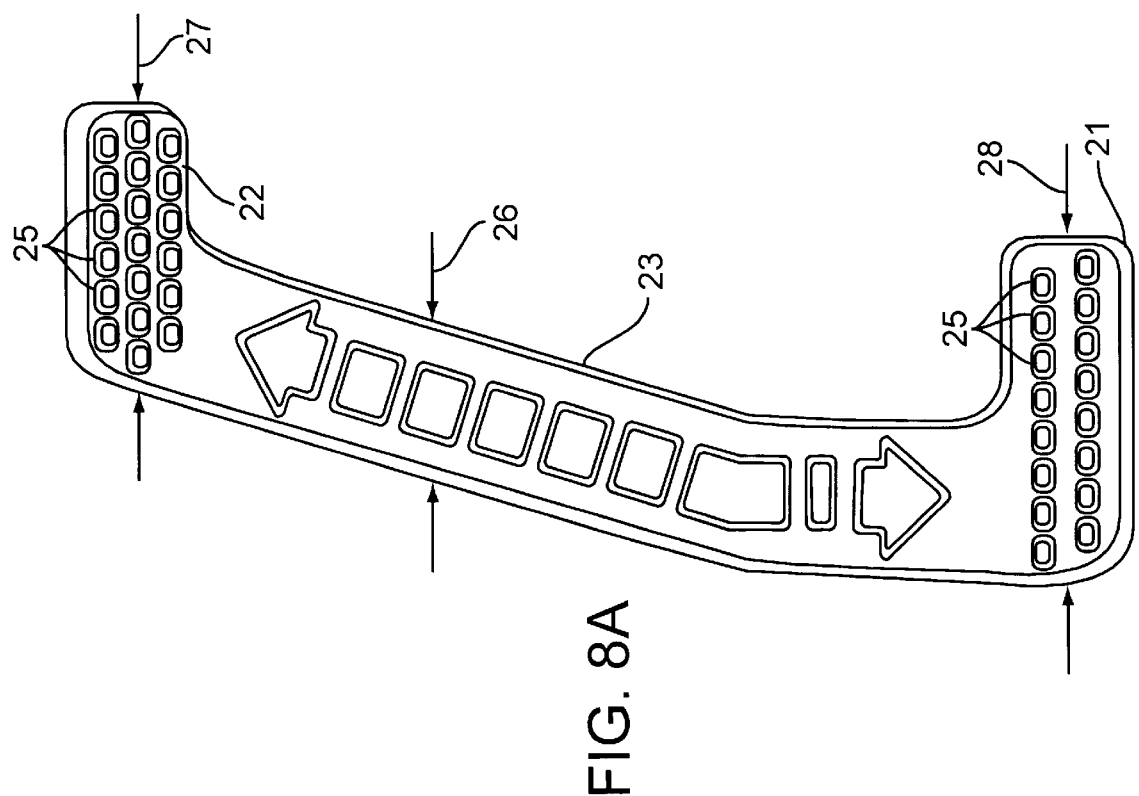
FIG. 8A is an overhead view of the hydrostatic transmission system pedal of the present invention.
Figure 8C:
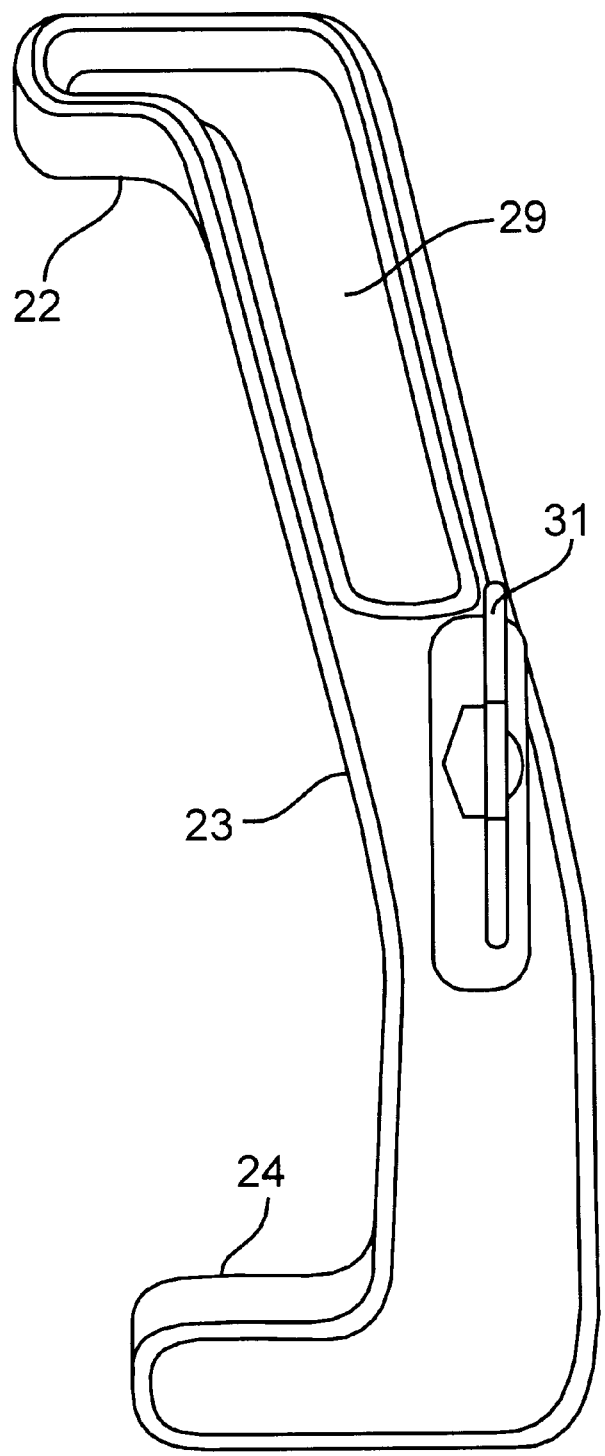
FIG. 8C shows the bottom view of the hydrostatic transmission system pedal of the present invention.
Figure 9:
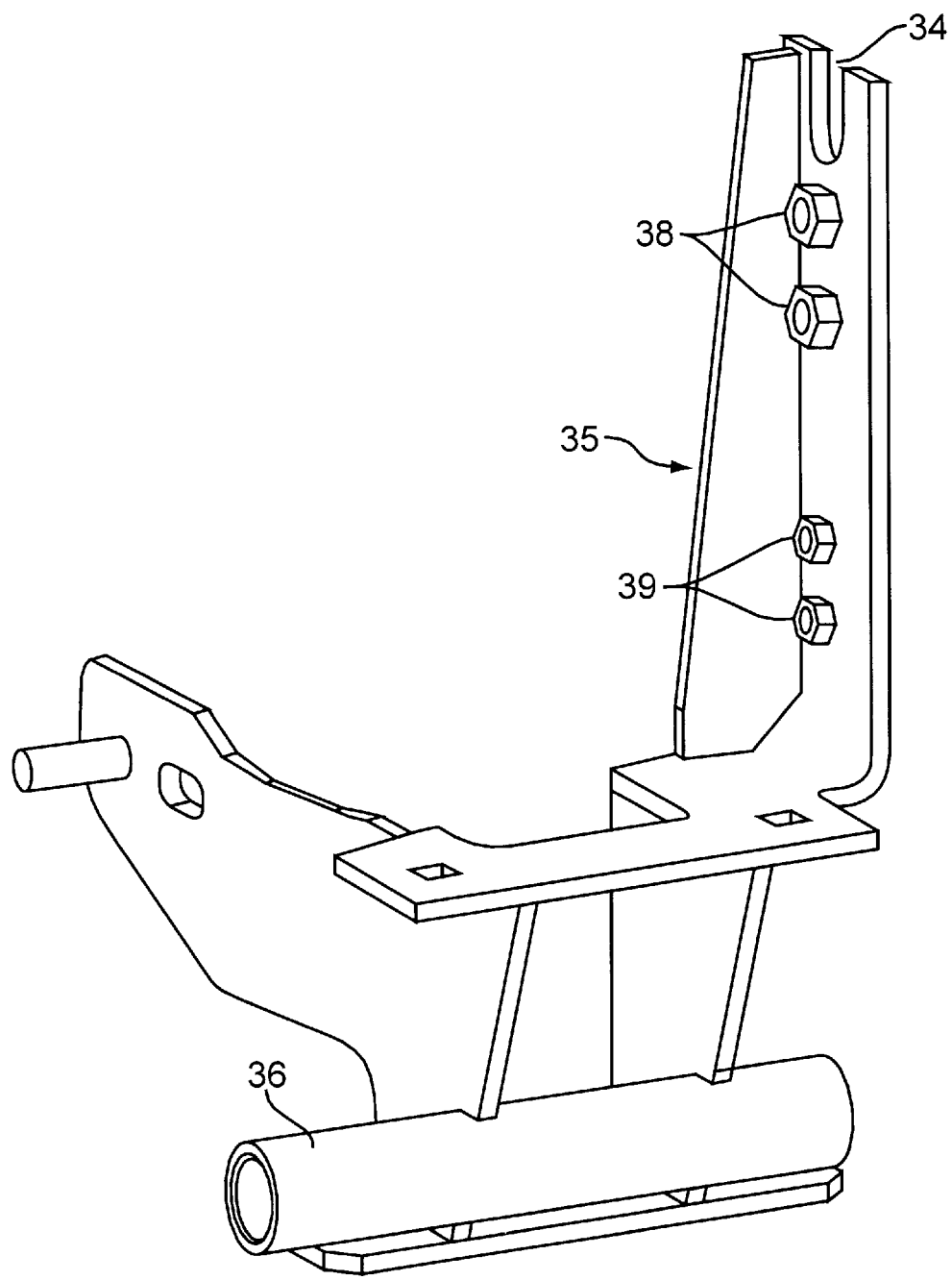
FIG. 9 shows a side view of the isolator plate of the present invention.
Figure 10:
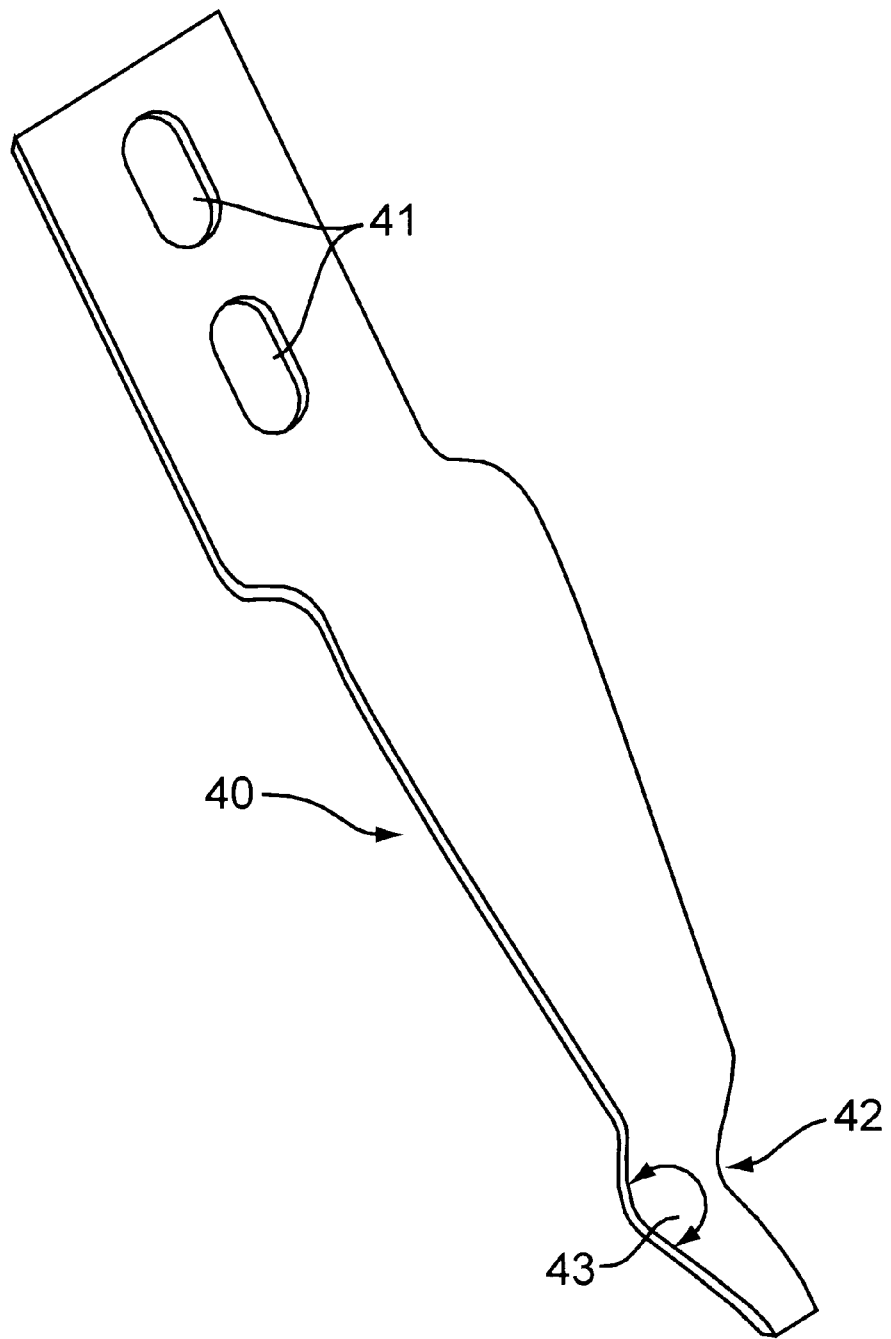
FIG. 10 shows a side view of the adjustable spring steel detent of the present invention.
Figure 11:
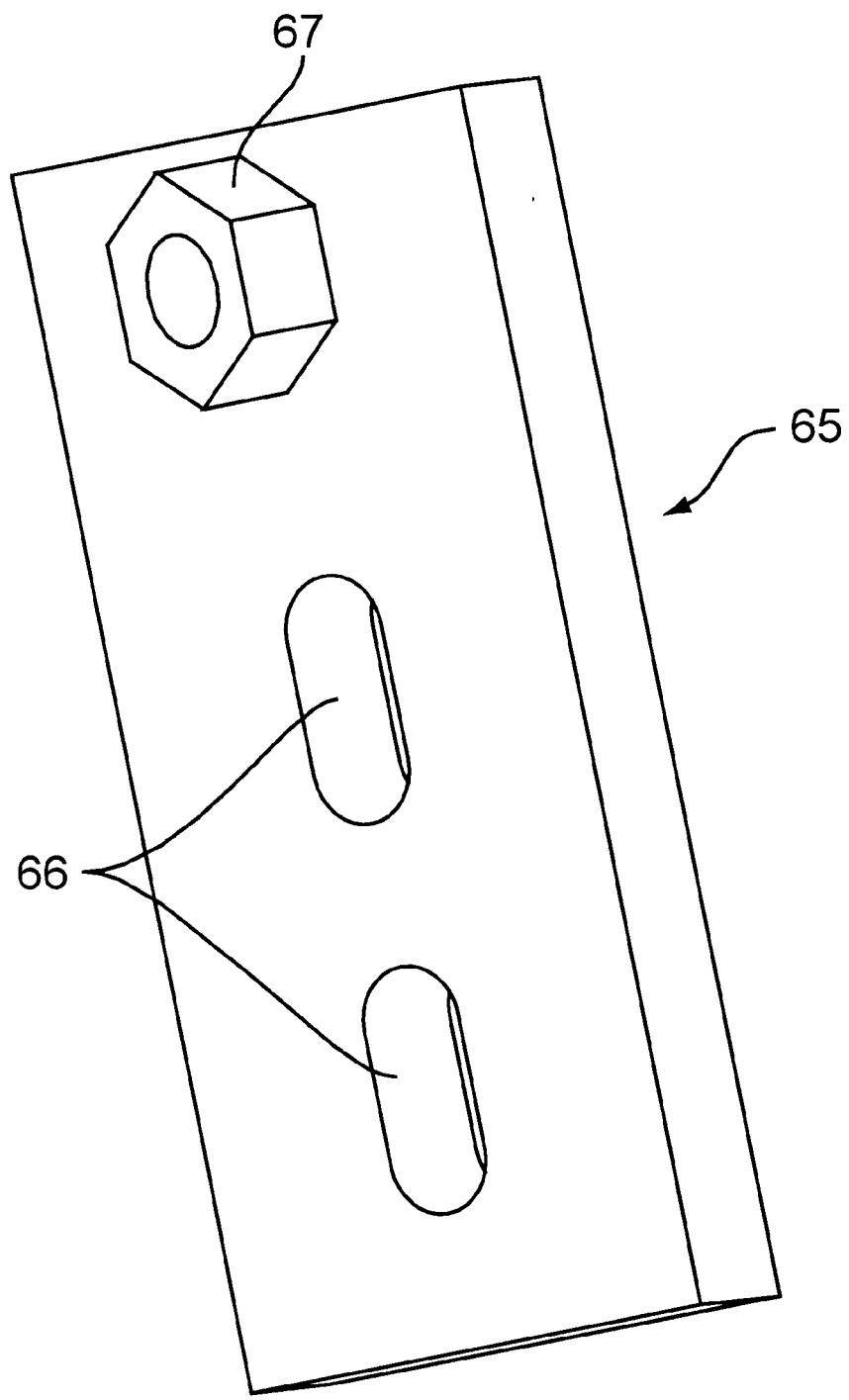
FIG. 11 shows a side view of the neutral adjust mount of the present invention.

The hydrostatic transmission system control pedal 21 (hydro pedal) is attached to the lower rocker arm 57. The hydro pedal 21 is supported by a pedal mount 31. The pedal mount 31 is attached to the pedal support bracket 60. The pedal support bracket 60 is pivotally attached to a support pivot 61 which is attached to the transmission housing 17. The lower rocker arm 57 is affixed to the pedal support bracket 60 at the lower rocker attach 59 which is positioned mid way between the support pivot 60 and the hydro pedal 21. The surface of the hydro pedal 21 consists of a narrow curved foot rest 23 best observed in FIG. 8B. At each end of the foot rest 23, is the elongated forward pad 22 and the elongated rearward pad 24. Each pad is covered with several 'no-slip' threads 25. It should be noted that the width of the elongated forward pad 28 and the width of the elongated rearward pad 28 are approximately twice as wide as the width of the foot rest 26. This design allows for an operator to rest their foot on the foot rest 23 and control the direction and speed of the tractor merely by either pressing down on the front of the foot rest 23 or the rear of the foot rest 23. In the alternative, an operator could rest his foot on the operator's platform 14 immediately beside the foot rest 23. The operator could control the motion of the tractor by raising their foot to depress the elongated forward pad 22 or by raising their heel to depress the elongated rearward pad 24. In this manner the operator would avoid contacting the foot rest 23. This alternative method is especially useful when the tractor is constantly changing direction such as during operations involving a loader bucket or lift. The hydro pedal 21 has a center of gravity 31 to is ensure that the pedal is maintained in a proper position. A hollowed region 29, as seen in FIGS. 8B and 8C, beneath the elongated forward pad 27 and the forward portion of the foot rest 23 ensures that the center of gravity 30 is positioned above the support pivot 61 and lower rocker attach 59.

Figure 4:
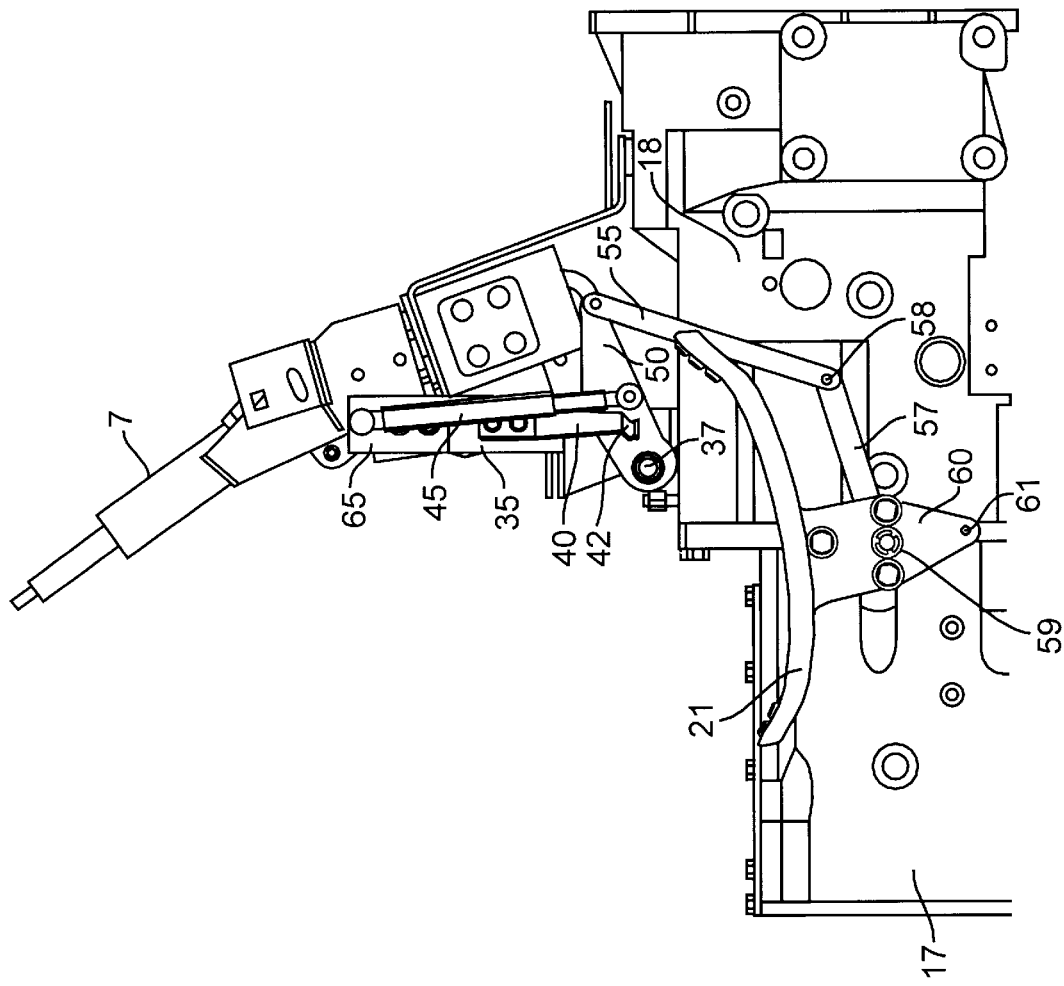
FIG. 4 is a side view of the present invention showing the hydrostatic transmission system pedal and pivot link in the neutral position.
Figure 5:
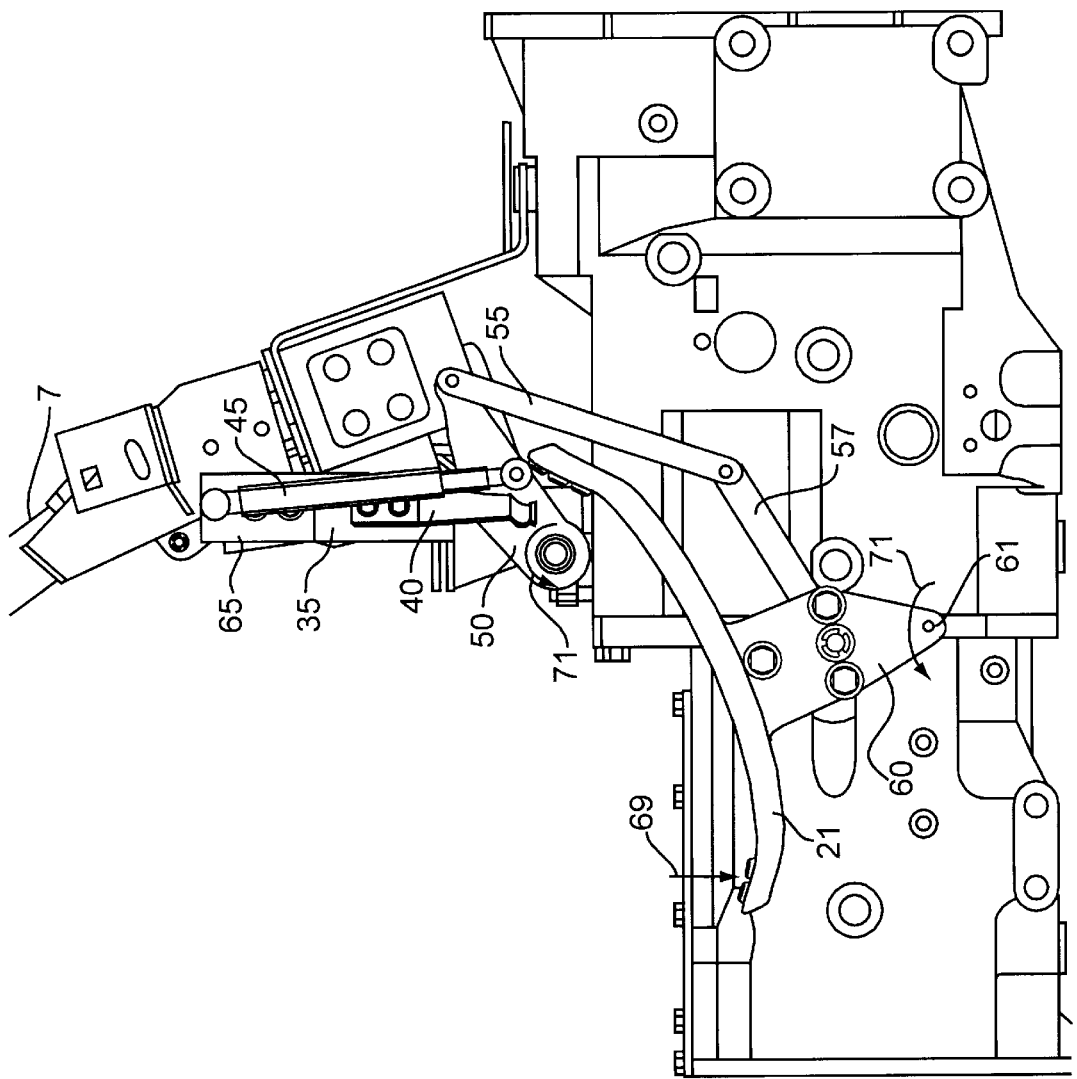
FIG. 5 is a side view of the present invention showing the hydrostatic transmission system pedal and pivot link in the reverse position.
Figure 6:
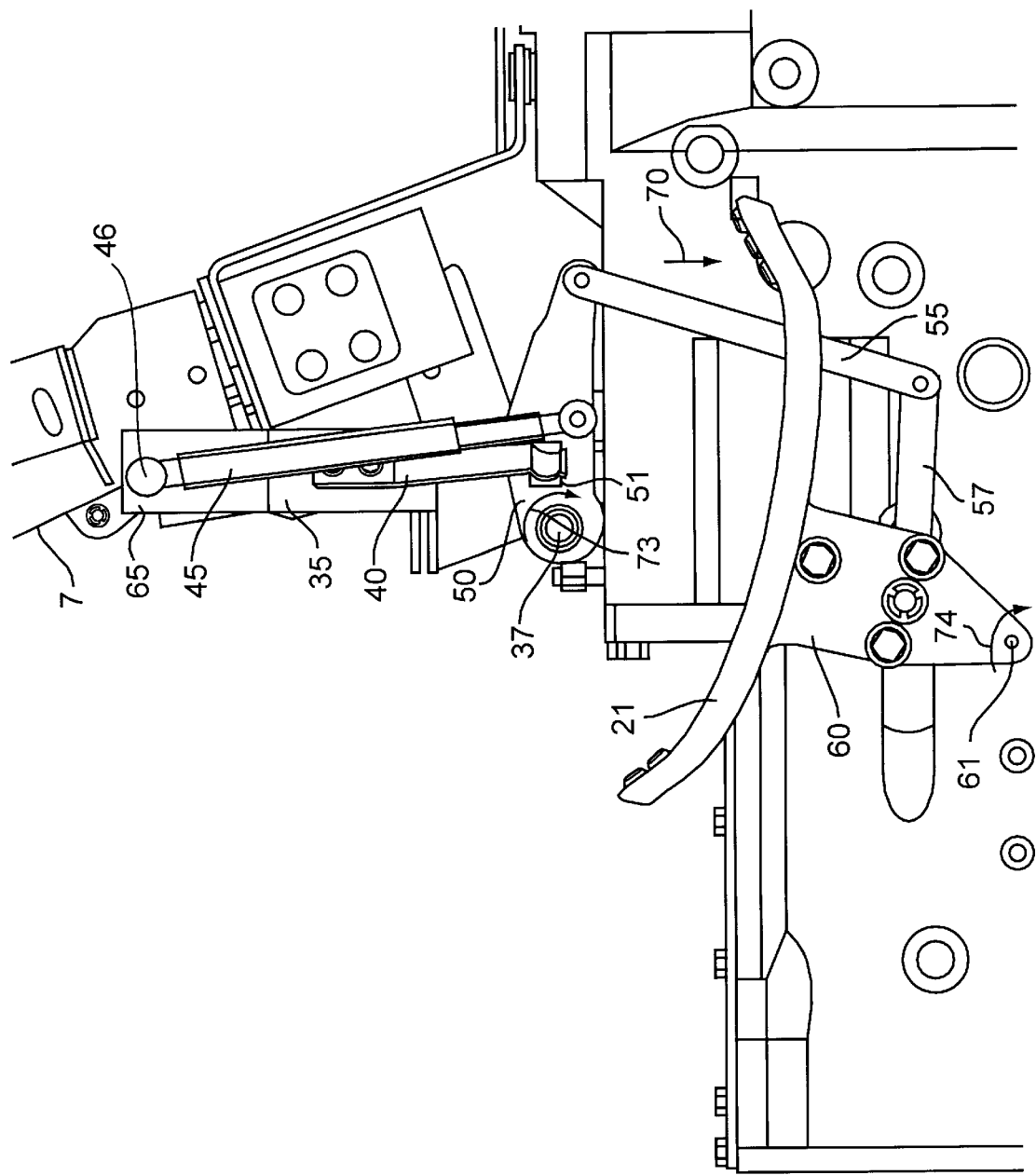
FIG. 6 is a side view of the present invention showing the hydrostatic transmission system pedal and pivot link in the forward position.
Figure 7:
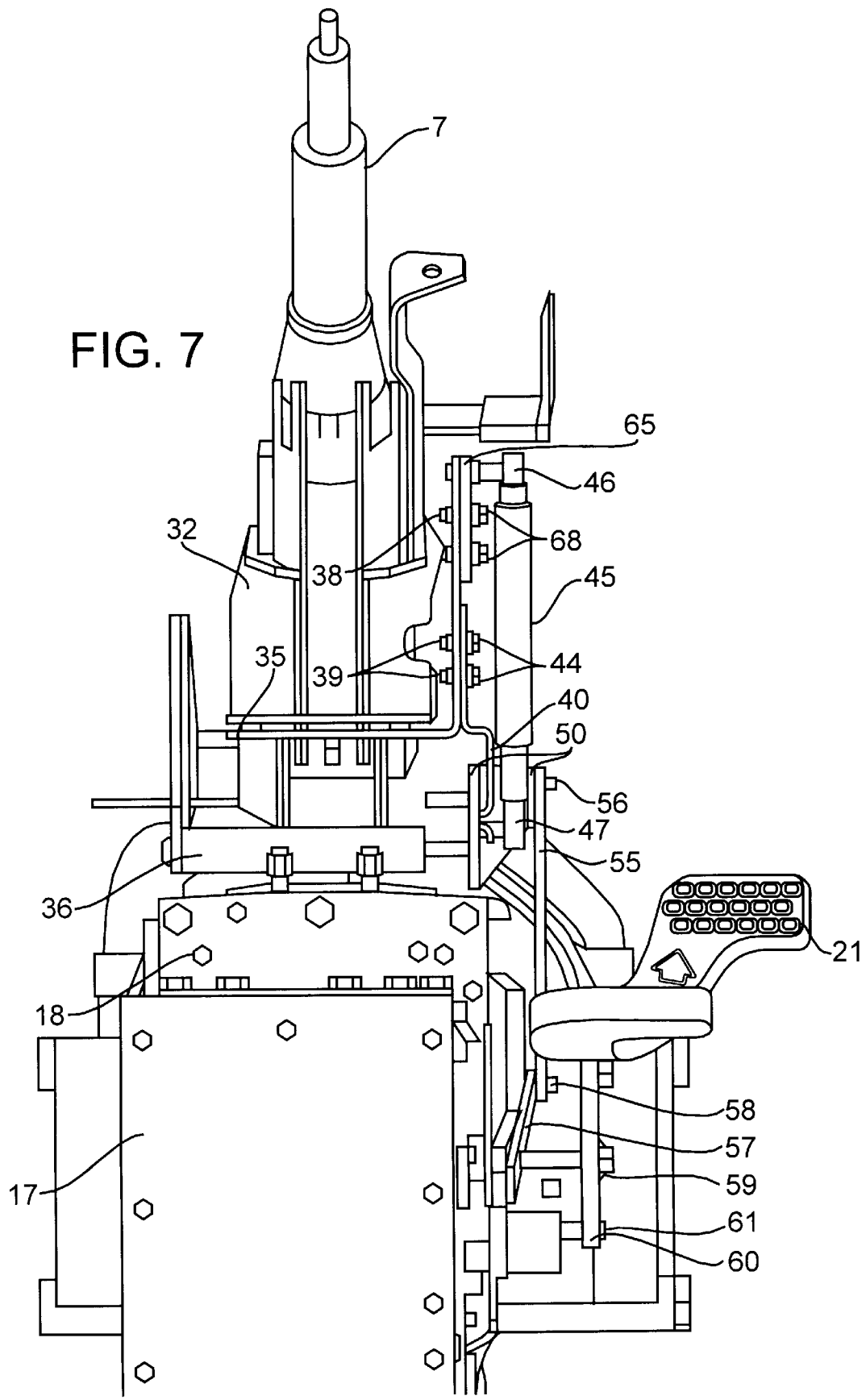
FIG. 7 is a rear view of the present invention.

In operation, a downward force 69, as best seen in FIG. 5, is exerted on the elongated rearward pad 24. This rotates the hydro pedal 21 and pedal support bracket 60 in a counter clock-wise motion 71 moving the lower rocker arm 57, upper rocker arm 55 and rotating the pivot link 50 counter clock-wise 71. The movement of the pivot link 50 moves the rod 52 which moves the tractor in a rearward direction. Conversely, a downward force 70, as best seen in FIG. 6, is exerted on the elongated forward pad 22. This rotates the hydro pedal 21 and pedal support bracket 60 in a clock-wise motion 74 moving the lower rocker arm 57, upper rocker arm 55 and rotating the pivot link 50 clock-wise 73. The movement of the pivot link 50 moves the rod 52 which moves the tractor in a forward direction. When no force is exerted on the hydro pedal 21, as best seen in FIG. 4, the centering damper 45 rotates the pivot link 50 until the V clip 42 of the detent 40 contacts and is inserted into the aperture 51. The sides of the V clip 42 exert sufficient force to hold the pivot link 50 in position. This is needed because a movement of 0.5 millimeters from neutral of the rod 52 will allow for the transmission to engage and the tractor to move or creep. This could create a potential hazard. The detent slots 41 in the detent 40 and the mount slots 66 in the neutral adjust mount 65 allow for the precise adjustment of the detent 40 and pivot link 50.

To install the present invention, first the detent 40 is loosely attached to the isolator bar 35. Then the adjust mount 65 is loosely attached to the isolator bar 35. Finally the centering damper 45 is attached to the pivot link 50 and the adjust mount. To adjust the linkage, the engine is engage to full throttle and the pivot link 50 is set to the neutral position. The V-clip is inserted into the aperture in the pivot link. Then the detent 45 is tightened. Finally, the adjust mount bolts are tightened.

It will be obvious to those skilled in the art that various changes may be made without departing from the scope of the invention and the invention is not to be considered limited to what is illustrated in the drawings and described in the specification.

What is claimed is:

1. A self-centering and dampening hydrostatic transmission linkage, comprising:
   a. an isolator plate affixed to a clutch housing;
   b. a pivot link pivotally affixed to the isolator plate;
   c. a hydraulic transmission adjustment rod affixed to the pivot link;
   d. a centering damper pivotally affixed between the pivot link and the isolator plate;
   e. an upper rocker arm pivotally affixed to the pivot link;
   f. a lower rocker arm pivotally affixed to the upper rocker arm; and
   g. a hydraulic transmission system control pedal pivotally affixed to a transmission housing, said pedal also affixed to the lower rocker arm, whereby the movement of the pedal controls the position of the hydraulic transmission adjustment rod.

2. The self-centering and dampening hydrostatic transmission linkage described in claim 1, further comprising an adjustable spring steel detent affixed to the isolator plate and said pivot link having an aperture, therein, whereby the detent contacts the aperture maintaining the position of the pivot link.

3. A self-centering and dampening hydrostatic transmission linkage, comprising:
   a. an isolator plate affixed to a clutch housing said isolator plate having a shaft tube, said isolator plate having an adjustable spring steel detent slideably affixed;
   b. a pivot link pivotally affixed to the shaft tube, said pivot link having an aperture, therein, said aperture for receiving the detent;
   c. a hydraulic transmission adjustment rod affixed to the pivot link;
   d. a centering damper pivotally slideably affixed between the pivot link and the isolator plate, said centering damper for controlling the position of the pivot link;
   e. an upper rocker arm pivotally affixed to the pivot link;
   f. a lower rocker arm pivotally affixed to the upper rocker arm; and
   g. a hydraulic transmission system control pedal pivotally affixed to a transmission housing, said pedal also affixed to the lower rocker arm, whereby the movement of the pedal controls the position of the hydraulic transmission adjustment rod.

4. The self-centering and dampening hydrostatic transmission linkage described in claim 3, wherein the detent filter comprises a detent slot through which a detent attach bolt is inserted, said bolt affixed to the isolator plate allowing the detent to be adjusted.

5. The self-centering and dampening hydrostatic transmission linkage described in claim 4, wherein the detent further comprises a 'V' clip, said V clip is inserted into the aperture.

6. The self-centering and dampening hydrostatic transmission linkage described in claim 5, wherein the centering damper further comprises a lower rod end pivotally affixed to the pivot link and an upper rod end pivotally affixed to the isolator plate.

7. The self-centering and dampening hydrostatic transmission linkage described in claim 6 wherein said isolator plate further comprising a neutral adjust mount for receiving the upper rod end, said neutral adjust mount further comprising a mount slot through which a neutral adjust bolt is inserted allowing the centering damper to be adjusted.

8. The self-centering and dampening hydrostatic transmission linkage described in claim 7, wherein the hydraulic transmission system control pedal further comprises a narrow curve foot rest with an elongated forward pad and an opposingly mounted elongated rearward pad, said foot rest also having a pedal mount and a pedal support bracket, said pedal bracket affixed to the lower rocker arm.

9. The self-centering and dampening hydrostatic transmission linkage described in claim 8 wherein the foot rest and forward pad have a hollowed region, therein.

10. The self-centering and dampening hydrostatic transmission linkage described in claim 9, wherein a width of the elongated forward pad and a width of the elongated rearward pad is greater than a width of the narrow curved footrest.

11. The self-centering and dampening hydrostatic transmission linkage described in claim 10, wherein the elongated forward pad and the elongated rearward pad have a plurality of no-slip threads.

12. In a hydrostatic transmission of an agricultural tractor, said tractor having a pair of front wheels and a pair of rear wheels, said wheels propelled by a hydrostatic transmission, said transmission controlled by a hydrostatic transmission system control pedal, said pedal located on an operator's platform reached by a platform step, said platform having a steering wheel supported by a steering column, said platform also containing an operator's chair, a brake and a plurality of controls for operating a hitch and a front mount, said tractor also having a roll-over protection bar, an engine compartment with a fuel tank, said transmission having a transmission housing and a clutch housing, the improvement comprising:

a. an isolator plate affixed to a clutch housing said isolator plate having a shaft tube;

b. a pivot link pivotally affixed to the shaft tube;

c. a hydraulic transmission adjustment rod affixed to the pivot link, said rod controlling the direction and the speed of the tractor;

d. a centering damper pivotally affixed between the pivot link and the isolator plate;

e. an upper rocker arm pivotally affixed to the pivot link;

f. a lower rocker arm pivotally affixed to the upper rocker arm; and g. a hydraulic transmission system control pedal having a narrow curved foot rest with an elongated forward pad and an opposingly mounted elongated rearward pad, said foot rest also having a pedal mount and a pedal support bracket, said pedal bracket affixed to the lower rocker arm said pedal also affixed to the lower rocker arm, whereby the movement of the pedal controls the position of the hydraulic transmission adjustment rod.

13. The improvement described in claim 12 wherein the foot rest and forward pad have a hollowed region, therein.

14. The improvement described in claim 13 wherein a width of the elongated forward pad and a width of the elongated rearward pad is greater than a width of the narrow curved footrest.

15. The improvement described in claim 14 wherein the elongated forward pad and the elongated rearward pad have a plurality of no-slip threads.

16. The improvement described in claim 15 wherein a downward force exerted on the rearward pad results in the pedal support bracket and the pivot link rotating in a counter clock-wise motion whereby the hydraulic transmission adjustment rod moves and causes the tractor to move in a rearward direction.

17. The improvement described in claim 16, wherein a downward force exerted on the forward pad results in the pedal support bracket and the pivot link rotating in a clock-wise motion whereby the hydraulic transmission adjustment rod moves and causes the tractor to move in a forward direction.

18. The improvement described in claim 17, wherein said pivot link has an aperture, therein and an adjustable spring steel detent affixed to the isolator plate, whereby the detent contacts the aperture maintaining the position of the pivot link.

19. The improvement described in claim 18, wherein no force is exerted on the pedal resulting in the centering damper rotating the pivot link to insert the detent into the aperture whereby the hydraulic transmission adjustment rod moves the transmission into a neutral position.

\* \* \* \* \*